Oct. 10, 1939.   O. P. McCARTY   2,175,905
ELECTRIC CIRCUIT
Filed May 24, 1938

Inventor:
Orin P. McCarty,
by Harry E. Dunham
His Attorney.

Patented Oct. 10, 1939

2,175,905

UNITED STATES PATENT OFFICE 2,175,905

ELECTRIC CIRCUIT

Orin P. McCarty, Pittsfield, Mass., assignor to General Electric Company, a corporation of New York Application May 24, 1938, Serial No. 209,686

14 Claims. (Cl. 171—119)

This invention relates to electric circuits and more particularly to improvements in arrangements for varying the number of turns of a winding which is connected in an alternating current circuit.

Examples of cases in which it is desirable to vary the number of turns of a winding in an alternating current circuit are adjustable chokes or reactors, and adjustable transformers. The adjustable transformers may either be power transformers whose voltage ratio it is desired to adjust or voltage-regulating transformers such as well-known step regulators.

In transferring the current in an alternating current circuit from one point to another on a winding connected in the circuit, it is desirable not to interrupt the main circuit current during the transfer and it is also desirable not to short circuit a portion of the winding during the transfer. This is because opening of the main circuit causes the production of excessive voltages and objectionable surges, lamp flicker, etc., while a short circuit of a portion of the winding causes an excessively high circulating current to be produced by the voltage between the short-circuited points.

Heretofore, various arrangements have been utilized for performing this operation without interrupting the main circuit current and without causing excessive circulating current to flow in the winding. However, these arrangements have all had one or more serious disadvantages in that they have either been relatively expensive or relatively unreliable or have produced excessive burning of the switch contacts resulting in their relatively short useful life.

In accordance with this invention I provide a novel and simple switching arrangement for varying the number of turns of a winding in an alternating current circuit. This arrangement is characterized by relatively low cost, relatively long life of the contacts and maximum reliability.

It is an object of the invention to provide a new and improved arrangement for varying the number of turns of a winding in an alternating current circuit.

It is another object of the invention to provide a simple, inexpensive and reliable switching arrangement for changing the ratio of a transformer.

The invention will be better understood from the following description taken in connection with the accompanying drawing and its scope will be pointed out in the appended claims.

Figure 1:
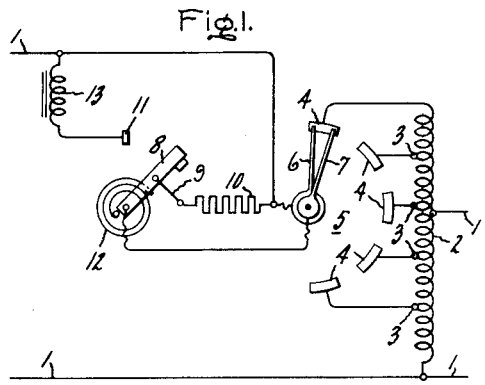
Figure 2:
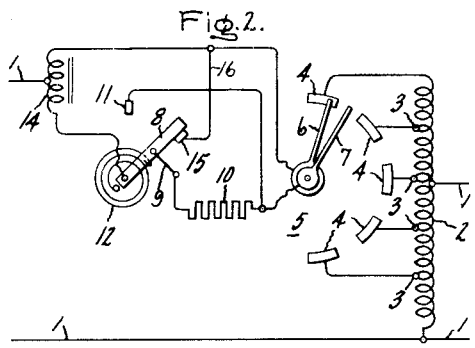
Figure 3:
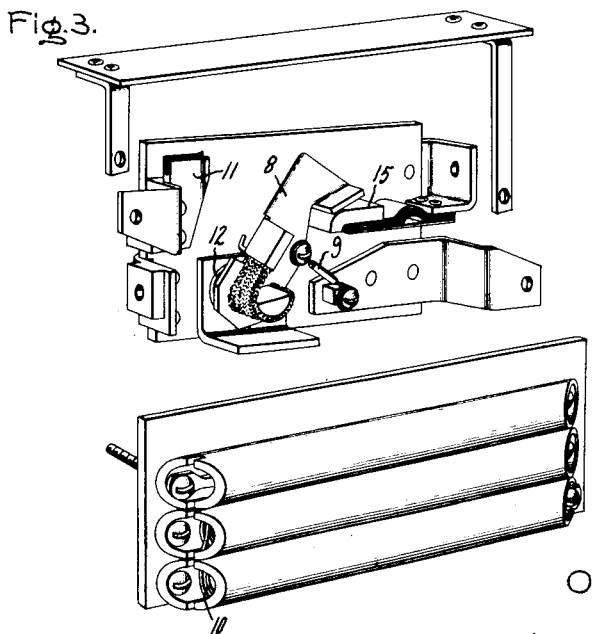

In the drawing, in which similar reference characters denote similar elements throughout the several views, Fig. 1 is a diagrammatic illustration of an embodiment of the invention utilizing what is referred to as an asymmetrical resistor and an asymmetrical reactor, Fig. 2 is a modification using an asymmetrical resistor and a symmetrical reactor and Fig. 3 is a so-called exploded view of the novel structural features of the invention which may be added to a conventional mid-tapped reactor two-finger switching arrangement so as to produce the circuit arrangement of Fig. 2.

Referring now to the drawing and more particularly to Fig. 1 there is shown therein an alternating current circuit 1 in which is connected a regulating autotransformer winding 2 provided with a plurality of spaced taps 3 each of which is connected to a separate tap contact 4. For successively engaging the tap contacts 4 there is a two-finger switch 5 provided with separate contact fingers 6 and 7. Contact finger 6 is connected directly to one of the conductors of the circuit 1, while contact finger 7 is normally connected to the same conductor through a serially connected arrangement comprising a switch arm 8, a tension fuse 9 and a resistor 10. The fuse 9 is held in tension and the switch arm is biased toward a fixed contact 11 by means of a spring 12. Connected between the fixed contact 11 on the same conductor of the main circuit to which the resistor 10 is connected is a reactor 13 which is preferably in the form of an iron core reactor.

The operation of Fig. 1 is as follows: Assume circuit 1 to be energized by any suitable source of current and that it is transmitting power from left to right. With the switch 5 in the position shown the two contact fingers 6 and 7 are in engagement with the same tap contact 4. Under these circumstances the main circuit current will divide through the contact fingers 6 and 7 in inverse proportion to their series impedance and as resistor 10 is in series with finger 7, while no resistance is in series with finger 6, substantially all of the main circuit current will flow through the contact finger 6. Assume now that the two contact fingers 6 and 7 are rotated simultaneously in a clockwise direction for the purpose of raising the voltage on the right hand side of the transformer 2. The resulting tap-changing operations take place in a well-known manner which may be described as a five-position four-step cycle. The parts have been illustrated and described in the first position. The second position is when the contact finger 7 disengages the tap contact 4. As substantially all of the current is being carried by the contact finger 6, this disengagement of the contact finger 7 interrupts substantially no current. As the contact fingers continue to move, their next position will be when contact finger 7 engages the next lowermost tap contact. Under these conditions a circulating current is caused to flow through the resistor 10 because there is impressed across this resistor the voltage between the two top tap contacts. If the instantaneous direction of current in the top conductor of the circuit 1 is in the same direction as the power flow, namely from left to right, and if at the same instant the polarity of the winding 2 is such that the top tap contact is at a higher potential than the next lowermost tap contact, the circulating current will subtract from the load current in the switch finger 6. By reason of the fact that the circulating current is limited by a resistor, the power factor of this circulating current will be relatively high. If the load power factor is also relatively high the circulating current will subtract substantially directly from the load current. At certain values of load it may be made to neutralize entirely the load current so that no current is carried by the contact finger 6 and the contact finger 7 carries only the circulating current. In the next position of the switch 5 the contact finger 6 leaves the top tap contact 4. If the operating conditions are as described immediately above, this will cause no interruption of current as the contact finger 6 is carrying no current, otherwise whatever current is being carried by the contact finger 6 will be interrupted. There will now be no circulating current and all of the main circuit current will be carried by the resistor 10. In the final position of the operating cycle of the switch, the contact finger 6 will engage the second tap contact whereupon the main circuit current will transfer to the contact finger 6 and operating conditions in the switching mechanism will be the same as for the positions illustrated in the drawing, the only difference in the circuit being that the voltage on the right hand side of the transformer 2 has been raised by the difference in voltage between the two topmost taps of the winding.

Resistor 10 is made quite cheaply in the form of an ordinary resistance wire but it cannot carry the current for any substantial length of time. For this reason, switch 5 is normally operated in such a manner that both contact fingers 6 and 7 engage one of the contacts, as in the illustrated position, and it is moved relatively rapidly from one such position to the next through the intermediate positions whenever it is necessary to make a tap change.

However, the operating mechanism for the switch (not shown) will occasionally break down or otherwise operate improperly or there may be a failure of the power source for operating the switch. In such case the switching mechanism may be left in an intermediate position, such as in a position where the contacts 6 and 7 are bridging two adjacent contacts or in a position in which the switch finger 7 is alone engaging one of the tap contacts. Under these conditions the resistor 10 will become dangerously overheated and in oil-filled transformers may even cause fire and destruction of the entire apparatus, or else the resistor will burn out, thus, interrupting the main circuit.

However, the fuse 9 is so proportioned that it will melt before the resistor 10 becomes dangerously over-heated. As soon as the fuse melts the switch arm 8 engages the contact 11, thus, substituting the reactor 13 for the resistor 10. A reactor which can carry the main circuit current continuously can be made relatively cheaply so that the addition of this reactor adds little to its expense and results in a very reliable circuit. The operation of the system with the reactor is substantially the same as with the resistor except that the contacts have to absorb the inductive kick of the reactor and have to carry the relatively very high in-rush current of the reactor so that if operation of the reactor is long continued, the contacts tend to become seriously burned and their useful life is decreased. The reactor, however, permits the circuit to continue in operation if the switching mechanism should free itself or if the operating power for the switch should again come on after a power failure.

In Fig. 2 the switching circuit has been rearranged so as to permit the use of a mid-tapped or symmetrical reactor 14 in place of the asymmetrical reactor 13 of Fig. 1. The tension fuse operated switch is also provided with an auxiliary contact 15 which by means of a suitable conductor 16 short circuits the reactor 14 during normal operation. The contact finger 6 is connected to the upper conductor of the circuit 1 through both halves of the reactor 14 and the contact finger 7 is also connected to the same side of the circuit through both halves of the reactor 14 but it has in series therewith the resistor 10 and the fuse 9.

With these connections the normal operation is similar to that of Fig. 1, the only difference being that the main circuit current automatically divides equally between the two halves of the reactor 14 by reason of the short circuit around it. However, if the switching mechanism operates in an abnormal manner the fuse 9 will melt, thereby causing the switch arm 8 to leave the contact 15 and engage the contact 11. The melting of the fuse 9 open circuits the resistor 10, the disengagement of the contact arm 8 and the fuse 9 opens the short circuit around the reactor 14 and the engagement of the contact arm 8 with the contact 11 substitutes the symmetrical reactor 14 for the asymmetrical resistor 10. That is to say, the reactor 14 is now connected directly between contact fingers 6 and 7 whereas previously the resistor 10 had been connected directly between the contact fingers 6 and 7. With the reactor 14 connected in this manner the operation is the same as for a conventional two-finger tap-changing circuit using a mid-tapped or symmetrical reactor.

Fig. 3 illustrates the added apparatus which is necessary to convert a conventional tap-changing circuit using a symmetrical reactor into a circuit as shown in Fig. 2 which normally operates with an asymmetrical resistor, so as to give long life to the contacts, and which is protected against faulty operation of the switching means by the fuse 9. This additional structure is relatively inexpensive and occupies relatively small space.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, an alternating current circuit, a winding, switching means for selectively connecting various amounts of said winding in said circuit, said switching means having a plurality of normally stationary positions between various pairs of which it is normally temporarily in motion, means including a resistor arranged to carry the circuit current when said switching means is moving between said normal positions, said resistor being incapable of continuously carrying the full circuit current, a reactive device capable of continuously carrying the full circuit current, and means operative if said switching means operates abnormally for substituting said reactive device for said resistor.

2. In combination, an alternating current circuit, a winding, switching means for selectively connecting various amounts of said winding in said circuit, said switching means having a plurality of normally stationary positions between various pairs of which it is normally temporarily in motion, means including a resistor arranged to carry the circuit current when said switching means is moving between said normal positions, said resistor being incapable of continuously carrying the full circuit current, a reactive device capable of continuously carrying the full circuit current, and protective means operative if said switching means operates abnormally when said resistor is carrying a substantial amount of current for substituting said reactive device for said resistor without interrupting said current.

3. In combination, an alternating current circuit, a winding, a switching means for selectively connecting various amounts of said winding in said circuit, said switching means having a plurality of normally stationary positions between various pairs of which it is normally temporarily in motion, means including a resistor arranged to carry the circuit current when said switching means is moving between said normal positions, said resistor being incapable of continuously carrying the full circuit current, a reactive device capable of continuously carrying the full circuit current, and means operative if said switching means operates abnormally for open circuiting said resistor and substituting said reactive device for said resistor.

4. In combination, an alternating current circuit, a winding, switching means for selectively connecting various amounts of said winding in said circuit, said switching means in certain normally temporary positions being arranged simultaneously to make connection with different potential points in said winding, a resistor connected to prevent the occurrence of excessive circulating currents when said switching means is in said positions, a reactive device, and means operative if said switching means operates abnormally for transferring said circulating current from said resistor to said reactive device.

5. In combination, an alternating current circuit, a winding, switching means for selectively connecting various amounts of said winding in said circuit, said switching means in certain normally temporary positions being arranged simultaneously to make connection with different potential points in said winding, a resistor connected to prevent the occurrence of excessive circulating currents when said switching means is in said positions, a reactive device, and protective means operative if said switching means operates abnormally when said resistor is carrying current for open circuiting said resistor and causing said reactive device to limit the circulating current without interrupting the circuit current.

6. In combination, an alternating current circuit, a winding, switching means for connecting various amounts of said winding in said circuit, a resistor, said switching means having certain normally transitory positions in which said resistor is connected between different voltage points in said winding so as to limit the circulating current and having certain other normally transitory positions in which said resistor is connected to carry the circuit load current, said resistor being incapable of carrying the circuit load current continuously, a reactive device capable of carrying the circuit load current continuously, and means operative if said switching means operates abnormally for transferring said circulating current to said reactive device.

7. In combination, an alternating current circuit, a winding, switching means for connecting various amounts of said winding in said circuit, a resistor, said switching means having certain normally transitory positions in which said resistor is connected between different voltage points in said winding so as to limit the circulating current and having certain other normally transitory positions in which said resistor is connected to carry the circuit load current, said resistor being incapable of carrying the circuit load current continuously, a reactive device capable of carrying the circuit load current continuously, and means operative if said switching means operates abnormally for transferring said circulating current to said reactive device and open circuiting said resistor.

8. In combination, a transformer winding provided with taps, an alternating current circuit, switching means for selectively connecting said circuit to said taps, means including a resistor for preventing interruption of current in said circuit during a tap-changing operation of said switching means, a reactive device and means operative if said switching means operates abnormally for substituting said reactive device for said resistor.

9. In combination, a transformer winding provided with taps, an alternating current circuit, switching means for selectively connecting said circuit to said taps, means including a resistor for preventing interruption of current in said circuit during a tap-changing operation of said switching means, said resistor being incapable of carrying the normal current of said circuit continuously, a reactor capable of carrying the normal current of said circuit continuously, and fuse-controlled means responsive to current in said resistor for substituting said reactor for said resistor.

10. In combination, a transformer winding provided with spaced taps, a plurality of spaced contacts connected respectively to said taps, a pair of spaced contacts adapted successively to engage said plurality of spaced contacts, said pair of contacts being so arranged that at least one of them is always in engagement with at least one of said plurality of contacts, said plurality of contacts being so spaced relative to said pair of contacts that neither one of said pair can simultaneously engage two of said plurality of contacts, a resistor and a fuse serially connected between said pair of contacts, a reactor, and protective switching means responsive to the melting of said fuse for connecting said reactor directly between said pair of contacts.

11. In combination, a transformer winding provided with spaced taps, a plurality of spaced contacts connected respectively to said taps, a pair of spaced contacts adapted successively to engage said plurality of spaced contacts in a four-step five-position cycle in which in one position both of said pair engage one of said plurality, in a next position a first one of said pair disengages said one of said plurality, in another position said first one of said pair engages another of said plurality, in a succeeding position the remaining one of said pair disengages said one of said plurality, and in a remaining position both of said pair engage said other one of said plurality, an alternating current circuit, a reactor having its electrical mid-point connected to one conductor of said circuit, one terminal of said reactor being directly connected to one of said pair of contacts, the other terminal of said reactor being connected to the other of said pair of contacts through a fuse and a resistor, and a switch held in a position to short circuit said reactor and biased to a position to interrupt said short circuit and by-pass said resistor and fuse.

12. In combination, an alternating current circuit, a winding, switching means for selectively connecting various amounts of said winding in said circuit, said switching means having a plurality of normally stationary positions between various pairs of which it is normally temporarily in motion, means including a resistor arranged to carry the circuit current when said switching means is moving between said normal positions, said resistor being incapable of continuously carrying the full circuit current, a normally open-circuited reactive device capable of continuously carryin the full circuit current, and two position means operative if said switching means operates abnormally for substituting said reactive device for said resistor by first opening the circuit through said resistor and then closing the circuit through said reactive device.

13. In combination, a transformer winding provided with taps, an alternating current circuit, switching means for selectively connecting said circuit to said taps, means including a resistor for preventing interruption of current in said circuit during a tap-changing operation of said switching means, a reactive device, a normally open circuit for said device, and two position means operative if said switching means operates abnormally for substituting said reactive device for said resistor by first opening the circuit through said resistor and then closing the circuit through said reactive device.

14. In combination, a transformer winding provided with taps, an alternating current circuit, switching means for selectively connecting said circuit to said taps, means including a resistor for preventing interruption of current in said circuit during a tap-changing operation of said switching means, said resistor being incapable of carrying the normal current of said circuit continuously, a normally open-circuited reactor capable of carrying the normal current of said circuit continuously, and fuse-controlled means responsive to current in said resistor for substituting said reactor for said resistor.

ORIN P. McCARTY.